No. 896,317. PATENTED AUG. 18, 1908.
F. L. PAXSON.
CLAMP FOR SPACING THE BOWS OF VEHICLE TOPS APART.
APPLICATION FILED OCT. 11, 1907.
Fig. 1.
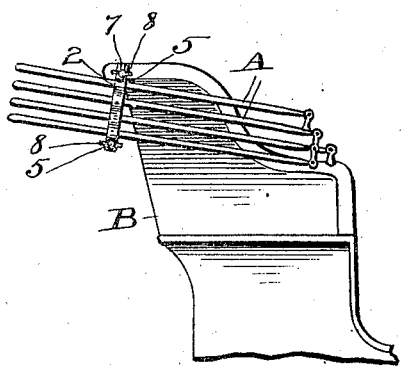
Fig. 2. Fig. 3.
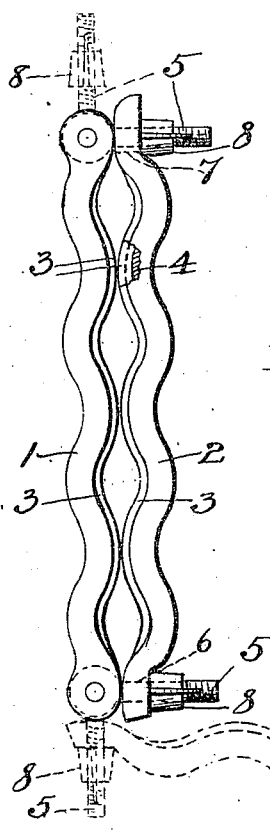 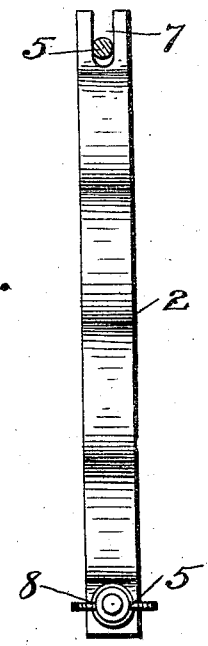

UNITED STATES PATENT OFFICE.

FRANK L. PAXSON, OF PHILADELPHIA, PENNSYLVANIA, ASSIGNOR TO PERCY L. NEEL, OF PHILADELPHIA, PENNSYLVANIA.

CLAMP FOR SPACING THE BOWS OF VEHICLE-TOPS APART.

No. 896,317.      Specification of Letters Patent.      Patented Aug. 18, 1908.

Application filed October 11, 1907. Serial No. 397,014.

*To all whom it may concern:*

Be it known that I, FRANK L. PAXSON, a citizen of the United States, residing at Philadelphia, in the county of Philadelphia and State of Pennsylvania, have invented certain new and useful Improvements in Clamps for Spacing the Bows of Vehicle-Tops Apart, of which the following is a specification.

My invention relates to devices for spacing the bows of vehicle tops apart when down so as to prevent them from chafing against one another and has for its object the provision of a device consisting of two strips of rigid material formed with corrugations and adjustably secured together so as to be capable of adjustment to varying sizes of bows.

The construction and operation of my improved clamp will be described hereinafter and illustrated in the accompanying drawings in which—

Figure 1 is a side view of a fragment of a vehicle showing the bows in a lowered position and the clamp in place, Fig. 2, an end view of the clamp, and Fig. 3, a side view.

In the drawings similar reference characters indicate corresponding parts throughout the several views.

My improved clamp consists of two corrugated metal bars 1 and 2 each of which has a strip of leather 3 or other suitable material secured to its inner side which may be grooved as shown at 4 to receive said strip or the groove may if preferred be omitted. Bar 1 has a threaded bolt 5 pivotally secured to each end while one end of bar 2 is provided with a hole 6 to receive one of the bolts 5 and the other end formed with a notch 7 to receive the other bolt.

8 indicates a thumb or wing nut or its equivalent on each bolt 5.

In operation my improved clamp is opened to be attached to the bows A of a vehicle B by loosening the wing nut 8 on the bolt 5 secured in notch 7 and the bolt swung on its pivot out of engagement with said notch. The bars 1 and 2 may then be spread apart using the hinged portion of the other bolt 5 secured in hole 6 as a pivot, or the bar 2 may be swung sidewise on the bolt itself as a swivel. It will be apparent that the distance between the bars 1 and 2 may be regulated to suit the thickness of the bows A, if greater than the distance between the bars at their widest parts, by loosening the nuts 8 so that my device is adaptable to covers of different varieties and sizes.

I have shown the clamp in use with a cover having four bows but it will be apparent that the device is adaptable to covers of a smaller number of bows and by increasing the length of the bars and the number of corrugations may be adapted to a greater number of bows.

Having thus described my invention what I claim is—

1. In a clamp for vehicle tops, two bars of rigid material correspondingly corrugated and pivotally and swivelly secured together, substantially as shown and described.

2. In a clamp for vehicle tops, two corrugated bars of rigid material, threaded bolts secured to one of said bars, the other bar formed to receive said bolts, and threaded fastenings on said bolts, substantially as shown and described.

3. In a clamp for vehicle tops, two corrugated bars of rigid material, threaded bolts pivotally secured to the ends of one bar, the other bar formed to receive said bolts, and threaded fastenings on said bolts, substantially as shown and described.

4. A clamp for vehicle tops, comprising two corrugated bars of rigid material, threaded bolts pivotally secured to the ends of one bar, the other bar having a hole in one end and a notch in the other to receive said bolts, and wing-nuts engaging said bolts, substantially as shown and described.

5. In a clamp for vehicle tops, two bars formed to separately embrace and support the bows of a vehicle top, threaded bolts secured to the ends of one bar, and the other bar formed to engage said threaded bolts and pivotally and swivelly mounted thereon, substantially as shown and described.

6. In a clamp for vehicle tops, two bars formed to separately embrace and support the bows of a vehicle top, threaded bolts pivotally secured to the ends of one bar, and the other bar having a hole in one end and a notch in the other to receive said bolts, and threaded fastenings engaging said bolts, substantially as shown and described.

In testimony whereof I hereto affix my signature in the presence of two witnesses.

FRANK L. PAXSON.

Witnesses:
HENRY H. BELKNAP,
HARRY GREER.